United States Patent [19]

Traverso et al.

[11] Patent Number: 5,777,998
[45] Date of Patent: Jul. 7, 1998

[54] METHOD AND CIRCUIT ARRANGEMENT FOR THE REALIZATION OF THE HIGHER PATH ADAPTATION/MAPPING FUNCTION IN SYNCHRONOUS DIGITAL HIERARCHY/OPTICAL NETWORK EQUIPMENT

[75] Inventors: Giovanni Traverso, Robbiate; Silvano Frigerio, Cantu'; Alberto Lometti, Merate, all of Italy

[73] Assignee: Alcatel N.V., Rijswijk, Netherlands

[21] Appl. No.: 344,083

[22] Filed: Nov. 23, 1994

[30] Foreign Application Priority Data

Dec. 22, 1993 [IT] Italy ................... MI93A2708

[51] Int. Cl.$^6$ .................................................. H04J 3/06
[52] U.S. Cl. ........................ 370/509; 370/516; 375/371
[58] Field of Search .................. 370/84, 102, 55, 370/105.1, 469, 505, 509, 516; 375/371

[56] References Cited

U.S. PATENT DOCUMENTS

| | | | |
|---|---|---|---|
| 4,451,917 | 5/1984 | DeCoursey | 370/108 |
| 5,001,708 | 3/1991 | Williams et al. | 370/105.1 |
| 5,018,132 | 5/1991 | Williams et al. | 370/13 |
| 5,027,351 | 6/1991 | De Prycker et al. | 370/94.1 |
| 5,033,044 | 7/1991 | Williams et al. | 370/105.1 |
| 5,062,107 | 10/1991 | Heiss et al. | 370/105 |
| 5,081,654 | 1/1992 | Stephenson, Jr. et al. | 370/105.1 |
| 5,091,907 | 2/1992 | Wettengel | 370/102 |
| 5,200,982 | 4/1993 | Weeber | 370/105.3 |
| 5,210,762 | 5/1993 | Weeber et al. | 371/69.1 |
| 5,251,238 | 10/1993 | Menk et al. | 375/355 |
| 5,255,293 | 10/1993 | Archer et al. | 375/372 |
| 5,331,630 | 7/1994 | Fujita et al. | 370/84 |
| 5,349,310 | 9/1994 | Rieder et al. | 331/18 |
| 5,400,367 | 3/1995 | Meylemans et al. | 375/354 |
| 5,402,452 | 3/1995 | Powell et al. | 375/372 |
| 5,404,380 | 4/1995 | Powell et al. | 375/363 |
| 5,416,768 | 5/1995 | Jahromi | 370/55 |
| 5,428,612 | 6/1995 | Scheffel et al. | 370/84 |
| 5,432,826 | 7/1995 | Rieder | 375/371 |
| 5,461,380 | 10/1995 | Peters et al. | 341/100 |

FOREIGN PATENT DOCUMENTS 9202999  2/1992  WIPO.

OTHER PUBLICATIONS

G783 CCITT Recommendation, Sep. 1993, pp. 9, 22–25, 40–44.
"Merged Version of G707, G708 and G709 Recommendations", COM 15–E Mar. 1994, International Telecommunication Union Para. 4 to 8.
Digital Hierarchy–Optical Interface Rates and Formats Specifications (SONET), ANSI T1.105 (Draft Nov. 1990, pp. 1, 16, 23–25, 45–48, 66–71).
"Transmission Networking: SONET and the Synchronous Digital Hierarchy", M. Sexton, A. Reid, Artech House Telecommunications Library, Boston, USA, 1992, pp. 124–145.
"Improvement of the Jitter Behaviour of SDH Transmission Equipment", P–N. Foerg, ICCT'92 Proceedings of 1992 International Conference on Communication Technology, Beijing, China, Sep./16–18, 1992, vol. 1, pp. 11.08/1.3.
"Synchronization and Timing of SDH Networks", W.E. Powell et al., Electrical Communication, 1993, 4th Quarter No. 4, Paris, France, pp. 349–358.

Primary Examiner—Douglas W. Olms
Assistant Examiner—Min Jung
Attorney, Agent, or Firm—Ware, Fressola, Van Der Sluys & Adolphson LLP

[57] ABSTRACT

The invention relates to a method and circuit arrangement for the realization of the Higher Path Adaptation (HPA) function in Synchronous Digital Hierarchy (SDH) equipment. Such function serves to equalize frequency difference between the synchronisms of signals coming from different nodes of the network. The equalization is carried out through the use of the positive and negative justification technique. The invention, through the alteration of the justification instants, is capable of reducing the capacity of the elastic storage and the generated wander.

12 Claims, 4 Drawing Sheets

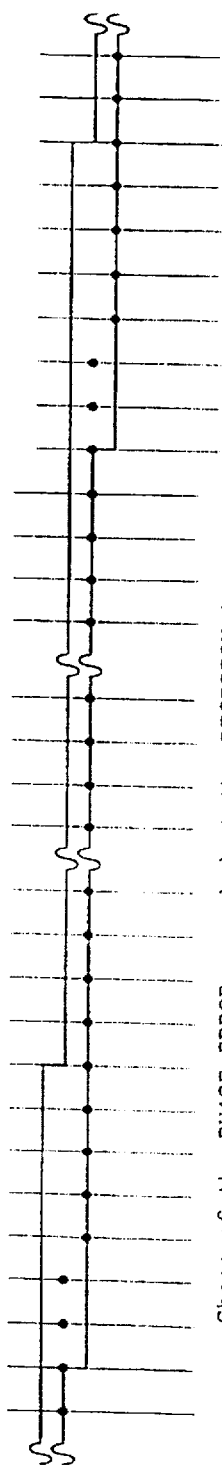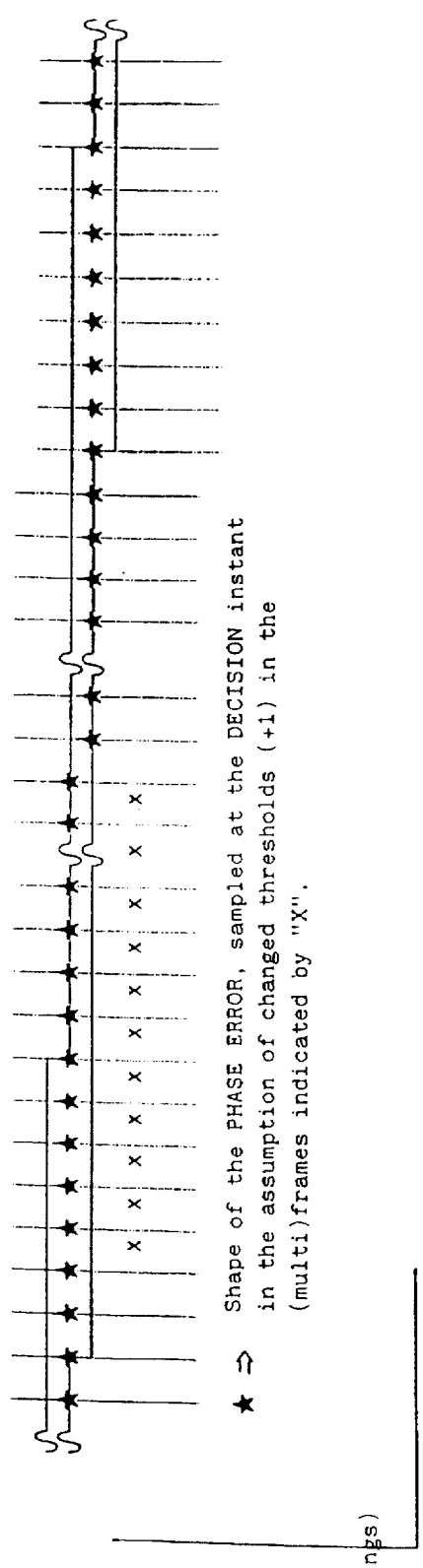
FIG. 4

METHOD AND CIRCUIT ARRANGEMENT FOR THE REALIZATION OF THE HIGHER PATH ADAPTATION/MAPPING FUNCTION IN SYNCHRONOUS DIGITAL HIERARCHY/OPTICAL NETWORK EQUIPMENT

TECHNICAL FIELD

This invention relates to a method and to a circuit arrangement for the realization of the Higher Path Adaptation (HPA) or mapping function in Synchronous Digital Hierarchy (SDH) or Synchronous Optical Network (SONET) equipment.

BACKGROUND OF THE INVENTION

In a synchronous network the timing signals are all locked to a reference primary source. The timing signal of this reference is carried along the entire network and used for synchronizing the local oscillators. However, these oscillators can show errors in the reconstruction of the timing signal. Therefore, it is necessary to provide for structures that allow the synchronization between the signals from different nodes of the network.

The functional structure of the multiplexing apparatus for the synchronous hierarchy is described e.g. in the G783 CCITT Recommendation, September 1993 pages 9, 22 to 25, 40 to 44 and in the document COM 15-E March 1994 titled "Merged Version of G707, G708 and G709 Recommendations" as issued by International Telecommunication Union (Para. 4 to 8). These provide for a function for processing the Tributary Units (TU) called Higher Path Adaptation (HPA); the same function is also known as "mapping" the transported services into the format required by the line layer and applied in apparatus operating in accordance with the ANSI standard ANSI T1.105 (Draft November 1990 pages 1, 16, 23 to 25, 45 to 48, 66 to 71) for the SONET synchronous hierarchy (which corresponds to SDH hierarchy of the CCITT). Examples of such services are DS1s, DS3s etc. For example, mapping DS3 into STS, mapping DS1 into VT, or VTs into an STS.

In the following, however, reference will be made to CCITT standard terminology, a direct correspondence between the structures of SDH and SONET frames existing anyway. Examples of such correspondence are shown in the following table:

| CCITT | T1/Bellcore |
|---|---|
| Regenerator Section | Section |
| Section (SOH) | Section + Path minus H1–H3 Pointers |
| Path | Path |
| AU Pointers | H1–H3 Pointers |
| Container (C) | Payload Capacity |
| Virtual Container (VC) | Synchronous Payload Envelope (SPE) |
| Tributary Unit (TU) | Virtual Tributary (VT) |
| TU-11 | VT-1.5 |
| TU-12 | VT-2 |
| (no equivalent) | VT-3 |
| TU-21 | VT-6 |
| TU-22 | (no equivalent) |
| Tributary Unit Group (TUG) | Virtual Tributary Group (VT Group) |
| Synchronous Transport Module (STM) | Synchronous Transport Signal (STS) |
| (no equivalent) | Level 1 (STS-1) |
| Level 1 (STM-1) | Level 3 (STS-3) |
| Level N (STM-N) | Level 3xN (STS-3xN) |
| Level Nc (STM-Nc) | Level 3xNc (STS-3XNC) |

To STM frames there correspond the STS frames, the Administrative Units are called AU both in the CCITT and, more particularly, H1–H3 Pointers in the ANSI rules; the Tributary Units, called TU in the first rules, are called VT in the second rules; the low order virtual containers, called LVC in the first rules, are called VTSPE in the second ones; the pointing mechanisms in question are the same in both cases, the AU-pointers being identical and replacing the TU-pointers with the VT-pointers; the range of variation of the possible values of the respective pointers is the same in both cases. The HPA function has for its object to equalize frequency differences between the clock of the higher order virtual container (HVC) in the node in which the TU has been assembled and the clock of the local HVC, de facto allowing the cross-connection between TUs from different sources.

In other words, downstream of the HPA, all the STM frames have the same Administrative Unit (AU) pointer fixed. It follows that all TUs contained in the above-mentioned frames are resynchronized with the local clock source and can be exchanged with each other.

This operation is always possible since the information content of the TUs is identified by two levels of pointers: the AU-pointer (hierarchically higher) and the TU-pointer (hierarchically lower). The HPA, operating on a frame in which both pointers are mobile, reconstructs the TU-pointer value corresponding to a fixed AU-pointer value (usually, but not exclusively, zero). The HPA, as described in the CCITT specification that constitutes the known art in the field, comprises a pointer interpreter, an elastic storage and a pointer generator for each of the processed tributaries. The information content of each tributary is written into the elastic memory after having been individuated (i.e. located or determined) through interpretation of TU-pointer (the value of the AU-pointer being known, interpreted in the function CCITT G738, "Multiplex Section Adaptation"). An STM frame with fixed AU-pointer is generated downstream of the elastic storage, in the time intervals of which data read out from respective elastic storages are inserted tributary by tributary. On the basis of the read-out instant, the pointer generator determines and inserts the appropriate TU-pointer value for every tributary. The filling up level of the elastic storage is compared with an upper threshold and a lower threshold; when in a determined instant of the TU-frame, the filling-up exceeds the upper threshold, the pointer generator carries out a negative justification (stuffing), by transmitting an extra information byte in the frame. The contrary occurs when the lower threshold is exceeded. The stuffing mechanism allows the absorption of the eventual differences between the write frequency and the read out frequency in the elastic storage. As a result of said mechanism the TU-pointer value evolves with time by describing a shift of the tributary information content with respect to the TU-frame that carries it.

In realizing an HPA function in practice two main system parameters in contrast with each other must be taken into account: the network wander rejection threshold, i.e. the slow variations of frequency between the signals, and the delay in the propagation of the tributary through the storage. It is important to observe that the behavior of the synchronous network towards the plesiochronous tributaries crossing it, as to the wander and propagation delay, is almost completely determined by the HPA function, whereby the proportionment of the parameters that condition its operation is of the utmost importance in designing a synchronous multiplexer.

It is evident that an optimal realization should maximize the network wander rejection by minimizing the propagation delay. Since these two requirements are conflicting, the first one requiring large storages and the second one small storages, it is necessary to find a compromise solution. The rules consider the problem of the wander rejection by defining the minimum spacing between the thresholds determining the hysteresis of the elastic storage towards pointer movements.

The propagation delay is not subject of rules, however it is already clear in an international context that extreme delays may negatively condition the transport of special services inside the network (for instance services using virtual concatenation).

A good compromise then consists in proportionating the HPA storages thus assuring the minimum hysteresis provided for by CCITT and in evaluating with great accuracy the margins to be assured in order to prevent storage-breakings under normal condition of operation. Such margins are given by the range of the storage filling up with stationary pointers, during a frame, (static band) summed with the margin necessary to tolerate movements of the write AU-pointers, and of write and read out TU-pointers (dynamic band).

Another problem is constituted by the wander generated by the HPA mechanism, in the presence of systematic and monotone AU-stuffings in the write frame. In fact, a train of consecutive and regular write AU-stuffings in only one way is absorbed by means of consecutive read TU-stuffings. In this case, the sequence of read movements is no longer regular, because of the structure of the frames, and a corresponding wander is originated. In fact, the presence of the redundancy bytes in the STM frames (like the SOH ones) makes the above TU-stuffings occur from close up or less depending on whether redundancy bytes (that delay the instant of read out) are present between the write and read instants.

In other words, it is true that the average rate of the TU-stuffings is proportional to the difference between the write and the read out frequencies, but this is not true for the instantaneous frequency. The observed wander is given by the fact that, being the stuffing instants irregular, also the shift of the tributary information content inside the TU carrying is irregular, and hence the frequency of the tributary, once demultiplexed, will be irregular. This phenomenon cannot be eliminated downstream, e.g. through filters, its characteristic frequency being small as one likes, as it is the difference between the write and read out frequencies.

SUMMARY OF THE INVENTION

It is a first object of the present invention to provide a method of realizing the HPA function capable of reducing the propagation delay through the memory. Another object is to reduce the wander generated by the HPA mechanism.

A further object of the present invention is to provide a circuit arrangement capable of implementing such method in an effective manner and at low cost.

Therefore, in accordance with the invention, in a method of realizing an HPA function in SDH equipments, instants of justification of a read frame TU-pointer are altered as a function of a value of a write frame AU-pointer.

In further accord with the present invention, said instants of justification are altered by modulating decision thresholds of the instants of justification.

In still further accord with the present invention, said thresholds are modulated in such a way that the instants of justification of the read frame TU-pointer are for compensating in advance eventual requests for an increase in an amount of memory occupied.

According further to the present invention, said thresholds are modulated in such a way as to tend to make the instants of justification of the read frame TU-pointer equispaced.

According still further to the present invention, the method locates a decision instant of justification that, for all tributaries, never crosses a section overhead (SOH) area in a write frame.

In accordance still further with the present invention, the method determines a correction factor to be summed to a received value of an AU-pointer in such a way as to take a relative position of a read frame and the write frame into account.

In accord with the method of the present invention the steps may comprise:

a) attributing an arbitrary fixed value to the read frame AU-pointer;

b) defining a phase-error as a difference between a write address and a read address, sampled in correspondence with a storage write in or a read out of a byte;

c) selecting one of a read or write frame with respect to which to sample the phase-error defined in step b);

d) defining, for every tributary, a decision point in the frame selected in step c) equal for said every tributary;

e) calculating the phase-error at the decision point defined in step d);

f) defining a static phase value that the phase-error calculated in step e) must have, in an absence of justifications, for every value of the write AU-pointer;

g) analyzing write and read instants implicit in respective write and read frames for obtaining a dynamic storage band and for obtaining values of the write frame AU-pointer such that a write AU-stuffing generates a discontinuity in the dynamic storage band;

h) defining in which areas and in which way the phase-error calculated in step e) should assume a value different from the one defined in step f) so as to compensate in advance for the discontinuity obtained in step g), so that an AU-stuffing as described in step g) does not cause storage of a further byte;

i) defining two thresholds for a stuffing decision, respectively positive and negative, in positions about the static phase defined in step f);

j) altering, according to the areas and in the way defined in step h), the positions of the thresholds defined in step i) so that, in so-altered areas a request for read TU-stuffing that shifts the phase-error calculated in step e) in a position of step h) arises, compensating in advance for the discontinuity of step g);

k) defining a storage capacity as a result of a sum of a hysteresis between the thresholds of step i), defining a static storage band, and a margin necessary for tolerating a write TU-stuffing positive or negative, thus eliminating effects of the dynamic storage band.

Stated otherwise, in accord still further to the method of the present invention, it may comprise the steps of:

a) attributing an arbitrarily fixed value to the read frame AU-pointer;

b) defining a phase error as a difference between a write and a read addresses sampled in correspondence with a writing or a reading of a byte;

c) choosing one of a read or write frame, with respect to which to sample the phase error of step b);

d) defining for each tributary a decision point in the frame chosen in step c) equal for said each tributary;

e) calculating the phase error at the decision point defined in step d);

f) defining a static phase value that the phase error calculated in step e) must have, in an absence of justifications, for every value of the write AU-pointer;

g) obtaining a phase error pattern from the preceding steps;

h) measuring a distance between observed discontinuities, in terms of values of AU, the values of the write AU-pointer relative to discontinuities of the pattern obtained at g) corresponding to the positions in which a read TU-stuffing would be performed, in a fixed-threshold system, in case of monotone sequences of write AU-stuffings;

i) defining the areas in which the position of the thresholds is alterable in such a way that, by shifting the AU-pointer values for which requests for TU-stuffings are generated, the discontinuities observed at step h) are equispaced as far as possible.

In another way of stating the method of the present invention, it may comprise the steps of:

a) defining two possible decision points in a read multiframe of a generic TU, so that they belong to two columns of an STM frame, distinct from each other;

b) defining a first set of decision circuits as a set of bytes corresponding to a first decision point selected in the step a), for all tributaries;

c) defining a second set of decision circuits as a set of bytes corresponding to a second decision point selected in the step a) for all tributaries;

d) determining, according to known offset between the read and write frames, which set of decision circuits, among those defined at steps b) and c), does not cross the SOH area of the write frame;

e) selecting, between the two decision points of step a), for all tributaries, a point whose set satisfies the condition of step d).

Still another way to state the method of the present invention is that it may comprise the steps of:

a) selecting an arbitrary reference position of the write frame with respect to the read frame;

b) defining a known distance, expressed in bytes, between the write and read frames as an offset therebetween;

c) assigning a fixed value to the AU-pointer of the read frame and determining a time position of a byte indicated by it;

d) defining, according to the known offset defined in the step b), a parameter value AUo of the AU-pointer that the write frame should have in order that the time position of the byte pointed by it approximates the value individuated at step c) as much as possible;

e) defining a correct value of the write AU-pointer as an absolute value of a sum of the parameter value AUo of step d) and a current write AU-pointer, where such absolute value is a maximum value that AU may assume;

f) processing the value obtained in the step e) as an effective write AU-pointer considering the offset between the write and read frame as having a value equal to the one selected at step a).

According to another aspect of the present invention, a circuit arrangement for the realization of the HPA function in SDH equipment, may comprise means for altering the justification instants of the read frame AU-pointer as a function of the value of the write frame AU-pointer.

According further to this other aspect of the present invention, a circuit arrangement may comprise means for determining an offset value between write and read frame and a relative correction value of the AU-pointer; means for adding said correction value to the AU-pointer value; means for determining the extent of variation of thresholds; and means for comparing write and read addresses.

By altering the stuffing instants of the read frame TU-pointer in a suitable manner, one is able to eliminate the above-mentioned drawbacks and to improve the performances of the HPA function.

In a particularly advantageous embodiment the stuffing instants are altered through a suitable modulation of the decision thresholds of the stuffings still maintaining unaltered the minimum spacing between the thresholds recommended by CCITT.

If the thresholds are modulated so that the stuffing requests of the TU-pointer are such as to compensate in advance eventual increases in the amount of occupied storage, an elastic storage of reduced capacity can be used and therefore the transit time of the signal in the storage itself is shortened. If, on the contrary, the thresholds are modulated so as to space out in an equal manner the stuffing requests of the read TU-pointer, the wander generated by the HPA mechanism is reduced if not eliminated.

It is clear that it is possible to find a compromise solution for a joint optimization of the transit time as well as of the wander.

It is possible to apply in an economically advantageous manner the described algorithm by processing all tributaries in the same way, independently of the phase shift between the read and write STM frame and from the value of the relative AU-pointers. It is still possible to apply a preprocessing function to the value of the write AU-pointer, so as to be able to define a sole table describing the algorithm, independently of the phase shift between the read and write STM frames. With the realization of the method as disclosed herein a circuit arrangement is obtained at low cost and with an increase in the overall performances, suitable, inter alia, for the implementation of semicustom circuits too. The wander reduction introduced by the HPA function entails benefits to the user that wishes to use the tributary flow as a reference for the synchronization of his equipments. Moreover, by reducing the above wander, the risk that the total wander introduced on the tributary of the network carrying it (sum of the contributions of all the elements of the network itself) exceeds the maximum values established in the specifications is reduced too.

These and other objects, features and advantages of the present invention will become more apparent in light of the detailed description of a best mode embodiment thereof, as illustrated in the accompanying drawing.

BRIEF DESCRIPTION OF THE DRAWING

FIG. 4 shows the shape of the space occupied in the storage in the case of unmodified thresholds and in the case of modified thresholds.

BEST MODE FOR CARRYING OUT THE INVENTION

Figure 1:
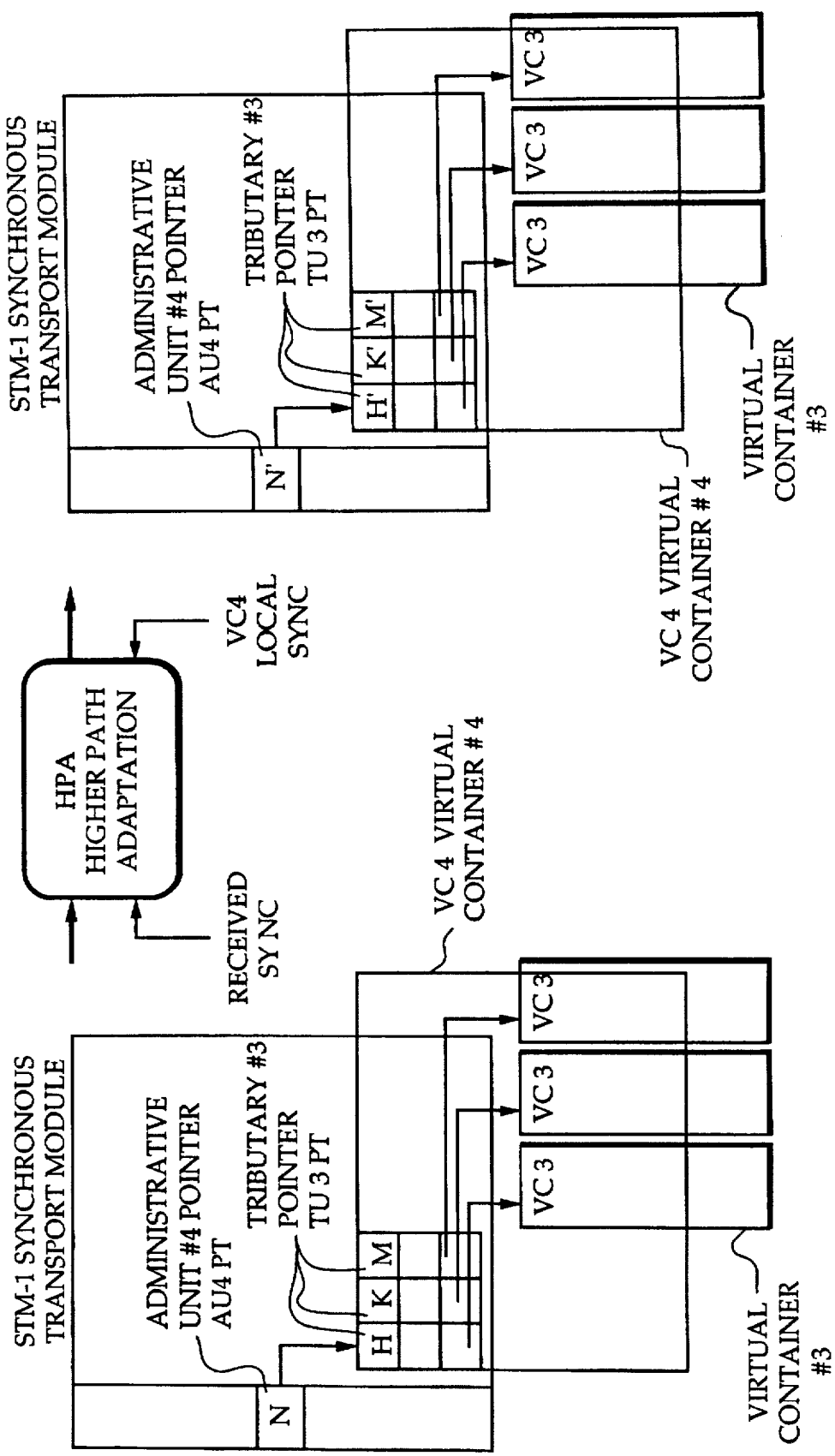
FIG. 1 shows the structure of an STM frame at the input and at the output of an HPA function.

As it can be seen in FIG. 1, an STM-1 frame is represented by a 9-rows×270-columns matrix where each element is an 8-bit byte. The first 9 columns of the matrix are reserved for the overhead functions (SOH), i.e contain information about auxiliary services, while the remaining part is reserved for the information bytes (payload). In the SOH section there is the AU-pointer which indicates the initial address of the payload in which there are the TU-pointers indicating the positions of the various tributaries. The value assumed by a pointer indicates the position of the first byte of the carried tributary (VC). This value is susceptible to variation during operation because of the justification (stuffing) process. This process allows the accommodation of instantaneous differences between the read and write frequencies astride an elastic storage: if the storage is becoming empty (the read out speed is higher) one decides to carry out a positive justification, otherwise, a negative justification.

A positive justification entails the transmission of one less VC information byte in the frame in progress; as a result, in the subsequent frame the pointer will be increased by one, the VC's position being shifted with respect to the frame carrying it; the contrary occurs on occasion of negative justifications. FIG. 1 further shows that at the output of the HPA function the pointers go through to variations so that the STM-1 frame is synchronized with the local clock.

The structure of the systems to which reference will be made in the following puts the section buffer (MSA: Multiplex Section Adaptation) before the HPA buffers, in accordance with the functional description contained in the apparatus CCITT rules. Having put the MSA buffer before the HPA buffer, has favorable consequences on the design and structure if the HPA itself, such as the possibility of a synchronous implementation of the HPA buffers (the phase offset $\Delta\emptyset$ between the read and write frames keeps constant with time). The exploitation of this feature, in principle leads to link the phase-shift, of the read and write STM frame to a value: if, on the contrary, one wishes to be free to arbitrarily pre-establish such Parameter on the point of the configuration of the system, it is necessary anyway to carry out a worst-case design.

The phase offset $\Delta\emptyset$ between input and output frames is in any case fixed by positioning the read out counter on delay/advance with respect to write:

$\Delta\emptyset$=WRITE phase—READ phase $\Delta\emptyset$>0 implies READ in ADVANCE $\Delta\emptyset$<0 implies DELAYED READ   1)

The range of $\Delta\emptyset$ can be limited, without jeopardizing the generality, to:

$0 \leq \Delta\emptyset < Nb\_tr$   2)

where Nb_tr is the number of bytes in an STM frame.

The static and dynamic band of the elastic storage will now be analyzed.

At the output of the HPA function the frame regenerated by construction is characterized by a prefixed and constant value of the AU-pointer. In all cases the format, of the read STM frame is invariant with fixed AU-pointer (null in the example under consideration).

Given the invariance of the read frame with times invariant is also the clock driving the extraction of the generic tributary from the buffer (edges in a known and fixed position). On the contrary, the shape of the write frame may vary because of the AU-stuffings (in steady conditions, fixed-AU frames, 783 different forms are possible, a priori). The memory occupation can then be expressed in function of the write AU-pointer value.

A STATIC BAND is defined as the maximum range of the phase error inside a READ TU-STUFFING (MULTI) FRAME in the absence of justifications and a DYNAMIC BAND is defined as the shape of the phase error with the write pointers in motion (AU-stuffing and TU-stuffing).

In order to univocally characterize the shape of the static and dynamic bands as a function of the write AU-pointer, it is necessary to assign a value AUs to each (multi)frame (defined on the read out) without ambiguity, even in the presence of justifications, whatever $\Delta\emptyset$ may be. The form of the static band, besides being a function of AUs, in general is also a function of the phase shift between read and write ($\Delta\emptyset$) and of the serial number of the tributary (TUn) under consideration although repeating itself unchanged (in the absence of justifications) at frame cycles: in fact, the position (referred to the STM frame) of the write clock edges with respect to the read out taken as a reference varies with $\Delta\emptyset$ in a manner, on the other hand dependent on the tributary. By expressing the phase error ($\Delta\epsilon$) as a difference between write address (IS) and read out address (IL) of the HPA reduced to dimension module of the storage (DM):

$$\Delta\epsilon = |IS - IL|_{DM} \qquad 3)$$

referring the shape of the static brand e.g. with respect to the byte counter of the read synchronous module (nl), what said above can be summarized in the following equations:

$$\Delta\epsilon(nl) = \Delta\epsilon(AUs, TUn, \Delta\emptyset nl + K*Nb\_tr) \quad K=0,1,2 \qquad 4)$$

where K is an arbitrary integer in the absence of justifications;

$$\Delta\epsilon_{tr} = [MAX(\Delta\epsilon(nl))]_{nl} - [MIN(\Delta\epsilon(nl))]+1 = \Delta\epsilon(AUs, Tun, \Delta\epsilon) \qquad 5)$$

$$\Delta\epsilon = [MAX(\Delta\epsilon_{tr})]_{AUs} = \Delta\epsilon_m(TUn, \Delta\emptyset) \qquad 6)$$

which represent respectively:

the amount of the phase error sampled at one point the amplitude of the static band in a single TU (multi) frame the maximum of the amplitudes searched amongst the possible frame forms, i.e. for all valid values of the AU-pointer:

$$0 \leq AUs \leq AUmax, \text{ with } AUmax=782 \qquad 7)$$

For loads of type TU1 an exhaustive analysis allowed the verification of the following statements:

the maximum amplitude $\Delta\epsilon_{tr}$ of the static band in a (multi)frame (but not its shape!) does not depend on the serial number of the tributary (TUn) under consideration: this is equivalent to simplify e.g. (5) as $$\Delta\epsilon_{tr} = [MAX(\Delta\epsilon(nl))]_{nl} - [NIN(\Delta\epsilon)nl)]_{nl} + 1 = \Delta\epsilon(AUS, \Delta\emptyset) \qquad 8)$$

the maximum of $\Delta\epsilon_{tr}$ as AUs is varied is a constant and therefore eq. (6) assumes the form $$\Delta\epsilon_{max} = \text{cost.} = 3 \qquad 9)$$

for $0 \leq AUs \leq AUmax$ the values of the write AU-pointer $AUs\Delta\epsilon_{max}$ for which the static band has a maximum amplitude ($\Delta\epsilon_{max}$), on the contrary, depend on $\Delta\emptyset$ and on the serial number of the tributary (TUn).

$$AUS_{\Delta\epsilon max} = Aus(TUN,\Delta\emptyset) \quad 10)$$

as a result of all preceding points it follows that critical values of AU (and hence the dynamic behavior) vary with the reciprocal position between the frames and, depending on this, eventually also with the serial number of the tributary. The dynamic band will now be analyzed. The write clock, unlike the read one, is, as a result of movements of the AU-pointer, variable with time. With the error $\Delta\epsilon$ deduced directly from the write and read addresses of a byte-organized storage it is possible to detect the effects of the AU-stuffings only when these produce unit phase variations: in other words the comparator works with one byte resolution (granularity). In write, 21, 7 and 1 are, for TU12, TU2 and TU3 respectively, the minimum distances, expressed in monotone AU-stuffings (TU being motionless), spacing two consecutive transitions: it follows that the maximum values of phase jumps due to the single motion of AU are equal to:

$$\Delta\epsilon_{AUgiuMax} = 1/21 \text{ of byte at TU12 level} \quad 11)$$

$$\Delta\epsilon_{AUgiuMax} = 1/7 \text{ of byte at TU2 level} \quad 12)$$

$$\Delta\epsilon_{AUgiuMax} = 1 \text{ byte at TU3 level} \quad 13)$$

that at the output of the comparator are transformed into steps (spaced out at TU1 aid TU2 levels) having width equal to its resolution:

$$\Delta\epsilon_{AUc} = 1 \text{ VC byte} \quad 14)$$

Hence there are write AU-stuffings that do not solicit at all the comparator while others give a (unit) step in the phase error: such justifications will be referred to as "critical" (i.e. they are those in correspondence of which the accumulation of 1 byte in the error is reached or exceeded). Given the invariance of the read out edges with respect to the STM (STS) frame and the synchronous character of the storages, it is evident that, the critical justification of a tributary unit occur, for a given phase-shift between read and write frames, always for well determined transitions of the AU (when any write edge gets ahead of the corresponding read out edge):

$$AU = AUc \quad 15)$$

The TU-stuffings, on the contrary, always induce 1-byte sharp variations in the storage occupation (one byte write in excess or in lack).

$$\Delta\epsilon_{Tu} = 1 \text{ VCbyte} \quad 16)$$

Given the independence of the write AU- and TU-stuffings, it is possible the for there to be overlap in the same (multi)frame of a critical AU-stuffing with a TU-stuffing of the same sign. In the selected structure, the phase-error at the comparator may then be subjected to 2-bit jumps due to justifications only:

$$\Delta\epsilon_c = \Delta\epsilon_{AUc} + \Delta\epsilon_{TU} = 2 \text{ VCbytes} \quad 17)$$

With regard to stuffing succession it can be observed that:

I. a long sequence of write consecutive and monotone TU-stuffings (at the maximum frequency) can be exactly compensated by the read out counterstuffings at the maximum frequency (500 Hz for TU1 or TU2, 2 KHz for TU3);

II. a long sequence of consecutive and write monotone AU-stuffings can be entirely compensated by the more or less frequent read counter-justifications;

III. in overlapping cases I and II, the read counter-justifications are able to compensate for the effect of the TU-stuffings only, but not for the effect of the AU-stuffings which determine a phase error drift leading the storage up to breaking.

Figure 2:
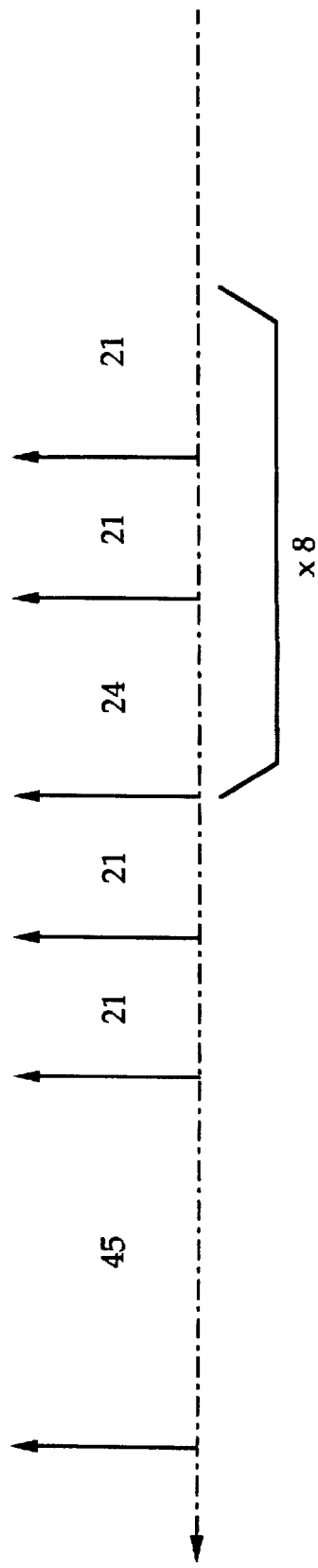
FIG. 2 represents the distribution of the stuffing instants of the TU-pointer in the presence of systematic AU-stuffings.

From point III above it follows that an important constraint to HPA design consists in assuring the storages holding, expressed e.g. in consecutive and monotone AU-stuffings, (AUs holding), in statistically reasonable conditions of degraded network. In the presence of detune between the timings of the frame entering the MSA of an apparatus of the synchronous hierarchy and of the outgoing frame, the latter will feature a regular and monotone sequence of AU-stuffings to accommodate the frequency difference in the transmission of the carried data. Therefore, it is of normal occurrence the presence of regular and monotone of AU-stuffings in the write frame of an HPA. Being the write AU-stuffings compensated by read TU-stuffings, taking as an example the case of TU12 tributaries, 35 TU-stuffings every 783 AU-stuffings will be originated in a distributed fashion as FIG. 2 summarizes. The TU-stuffings are generated when any write edge, through the effect of accumulation of $$N_{AUgiu} = N_{AUgiu}(AUs, TUn, \Delta\emptyset) \quad 18)$$

AU-stuffings having extent $$\Delta\epsilon_{AUgiu} = \Delta\epsilon_{AUgiu}(AUs, TUn, \Delta\epsilon) \quad 19)$$

equivalent to 3 bytes of AU, gets ahead of the corresponding read edge. Therefore, NAUgiu write AU-stuffings will fall between two subsequent read TU-stuffings, such that $$N_{AUgiu} * \Delta\epsilon_{AUgiu} = \Delta\epsilon_{AUc} \quad 20)$$

The value of $N_{AUgiu}$ corresponds to the distance between two subsequent AUc.

Should the AU-pointer values causing the read TU-counterstuffings be fairly distributed, the generated wander would be minimal (of extent equal to the effect of the single TU-stuffing). Conventionally, the read TU-stuffings are determined by comparison with the thresholds (in a pre-established position) of the phase error value, evaluated at, a pre-established point (the decision circuit DEC): more precisely in the stuffing opportunity (multi) frame, the justification is carried out or less on the basis of the error sampled in the immediately preceding (multi)frame (such quantity will be denoted as "error at decision circuit" $\Delta\epsilon_{DEC}$).

Through a decision criterion of this type, the maximum width of the static band becomes not so important but the lower ($\Delta\epsilon_{Di}$) and upper ($\Delta\epsilon_{DS}$) variations of the phase error with respect to the value sampled at the decision circuit in the preceding (multi)frame, will do.

In static conditions the following statements intestate those related to the static band discussed above:

the error $\Delta\epsilon_{DEC}$ is a function, besides of the selected decision circuit as it is obvious, of the basic parameters ($\Delta\emptyset$,TUn, AUs) in general, from which the shape of the static band depends.

$$\Delta\epsilon_{DEC} = \Delta\epsilon_D(\Delta\emptyset, TUn, DEC, AUs) \quad 21)$$

All what said for $\Delta\epsilon_{DEC}$ can be repeated (recalling (3) and (4)) also for the phase error variations in (multi)frame with respect to the decision circuit.

$$\Delta\epsilon_{Ds}=[MAX(\Delta\epsilon(nI))]_{nI}-\Delta\epsilon_{DEC}=\Delta\epsilon_{Ds}(\Delta\emptyset TUn,DEC,AUs) \quad 22)$$

$$\Delta\epsilon_{Di}=\Delta\epsilon_{DEC}-[MIN(\Delta\epsilon(nI))]_{nI}\Delta\epsilon_{Di}(\Delta\emptyset TUn,DEC,AUs) \quad 23)$$

from eq. (5) it follows that in a single (multi)frame the sum of the error variations with respect to the decision circuit equals the static band independently of the selected decision point $$\Delta\epsilon_{Di}+\Delta\epsilon_{Ds}=(\Delta\emptyset TUn, AUs) \quad 24)$$

a statement similar to the preceding one does not apply to maximum amplitudes gathered by scanning all possible AUs; i.e., once defined the limit variations as $$\Delta\epsilon_{Di-max}=[MAX\ (\Delta\epsilon_{Di})]_{AUs}=\Delta\epsilon_{Dim}(\Delta\emptyset TUn,DEC) \quad 25)$$

$$\Delta\epsilon_{Ds-max}=[MAX\ (\Delta\epsilon_{Ds})]_{AUs}=\Delta\epsilon_{Dsm}(\Delta\emptyset TUn,DEC) \quad 26)$$

it may result that $$\Delta\epsilon_{Ds-max}+\Delta\epsilon_{Di-max} \geq \Delta\epsilon_{max} \quad 27)$$

from the exhaustive analysis it results that, for TU1 loads, the maximum amplitudes of the error oscillations with respect to any decision point, evalued on all possible AUs, vary only with it $$\Delta\epsilon_{Di-max}=[MAX\ (\Delta\epsilon_{Di})]_{AUs}=\Delta\epsilon_{Dim}(DEC) \quad 28)$$

$$\Delta\epsilon_{Ds-max}=[MAX\ (\Delta\epsilon_{Ds})]_{AUs}=\Delta\epsilon_{Dsm}(DEC) \quad 29)$$

From a dynamic point of view, the considerations made previously extend unchanged also to the variation of the phase error at the decision, circuit; thus:

- the effective variations of the error at the decision circuit, through the effect of the AU-stuffings, are still expressed by equations (11), (12), (13) and the steps produced at the output of the comparator are given by eq. (14);
- the TU-stuffings always induce 1-byte jumps as indicated in the equation (16).

The considerations made so far lead to the statement that the dimension of an HPA storage with TU-stuffing decided on the phase error sampled in one point can be expressed as $$DM=Ist+\Delta\epsilon_{OUTi}+\Delta\epsilon_{OUTs}+2*\Delta\epsilon_{TU} \quad 30)$$

where the position of the lower (Sinf) and upper (Ssup) thresholds (assuming that the addressing starts from zero), is given by $$Sinf=\Delta\epsilon_{TU}+\Delta\epsilon_{OUTi}-1 \quad 31)$$

$$Ssup=DM-(\Delta\epsilon_{TU}+\Delta\epsilon_{OUTs})-1 \quad 32)$$

and with stuffing conditions determined by $$\Delta\epsilon_i \leq Sinf \quad 33)$$

$$\Delta\epsilon_i > Ssup \quad 34)$$

where

Ist and $\Delta\epsilon_{TU}$ are known constants with regard to the TU-stuffings (in the order: wander rejection and collection of the single write TU-stuffing)

$\Delta\epsilon_{OUTi}$ and $\Delta\epsilon_{OUTs}$ are functions that give the margin (respectively beyond the upper and beyond the lower stuffing threshold) to assure the storage holding also in condition of degraded network: in such condition, in fact, the contributions made by the static band ($\Delta\epsilon_{Di-max}$ and $\Delta\epsilon_{Ds-max}$) to the margin to be maintained for tolerating an acceptable number of consecutive AU-stuffings at the maximum frequency, add up. $\Delta\epsilon_{Di-max}$ and $\Delta\epsilon_{Ds-max}$ are bounded to the static band and represent the spacing to be left out of the lower and upper thresholds for the storage holding in steady conditions: they are not constants and introduce a dependence upon DEC for TU1. From the exhaustive analysis (because the aforesaid margin) it results that:

$$\Delta\epsilon_{OUTi}+\Delta\epsilon_{OUTs} > \Delta\epsilon_{max} \quad 35)$$

Hence the problem of storage synthesis can be considered as solved by the determination of the parameters minimizing the sum of $\Delta\epsilon_{OUTi}$ and $\Delta\epsilon_{OUTs}$ (then eq. 30 with the exception of the constants) and through it, the average propagation delay. As to the wander generated by systematic movements of the write AU-pointer, the values of AUc correspond to those values of AUs for which $\Delta\epsilon_{DEC}$ exceeds the stuffing decision threshold. By examining the mapping of TU12 tributaries in the STM frame, one obtains the distribution of the:

$$N_{AUsM}=N_{AUsM}(AUs,\Delta\emptyset) \quad 36)$$

described in FIG. 2. It is observed herein an interval of 45 AU-stuffings between two TU-stuffings, corresponding to a shift of the write frame in a position partially overlapped to the read one, a position in which the static band is reduced and the $\Delta\epsilon_{DEC}$ is not modified. In correspondence with partially overlapped row position there are also smaller intervals in which 24 AU-stuffings are absorbed without TU-counterstuffings. The average value of the phase increase due to one AU-stuffing, referred to the TU12 tributary, is $\Delta\epsilon_{AUsMed}$=number of C12 bits in one frame/number of AU-stuffing equivalent to one frame =8*32/783 =0.3269 UI      37)

where UI means Unity Interval.

The irregularity of 45 AU movements hence corresponds to one jitter equal to $$J_{AUmax}=45*\Delta\epsilon_{AUsMed}14.71 UI \quad 38)$$

As an example, the table of performance (TABLE 1) of an optimization achievable with the conventional method is reproduced hereinafter.

TABLE 1

Possible DECISION POINTS for TU12 in STM
Fixed parameters: $\Delta\phi = 1$
Variable parameters: DEC = 1 + 36; TUn = 1 + 63

| DEC (subframe) (edge) | Statistic average delay (μs ref. to 2 Mb/s.) | Jitter from AU-stuffing (UI ref. to 2 Mb/s) | Storage Dimension (byte) |
|---|---|---|---|
| 4 - #1 | 13.43 | 14.71 | 5 + 1st |
| 4 - #35 | 13.47 | 14.71 | 5 + 1st |
| 4 - #36 | 13.71 | 14.71 | 5 + 1st |
| 4 - #2 | 13.75 | 14.71 | 5 + 1st |
| 4 - #3 | 13.98 | 14.71 | 5 + 1st |
| 4 - #34 | 17.14 | 14.71 | 6 + 1st |

The values indicated are calculated with a frame format compliant with CCITT specifications.

By observing that the capacity and the holding of the HPA elastic storages depends on how the static band disposes itself about the decision point, it is possible to reduce the minimum capacity required by suitably changing the phase error at the decision circuit (then the indication of TE1-stuffing). If the target is to minimize the dimension of the storages it is necessary at first to transform the relation (35) into an equality (reduction of the sum of the error ranges to the theoretical minimum) in such a way as to symmetrize the variation, of the phase error with respect to the decision circuit. This result can be reached by changing, in function of the basic parameters $\Delta\theta$, TUn, DEC and AUs, the value sampled in the decision point whereby definition (21) of error at the decision circuit changes as follows $$\Delta\epsilon_{DV} = \Delta\epsilon_{DEC} + f(\Delta\theta, TUn, DEC, AUs) \qquad 39)$$

where $f$ is the correction term.

Equivalently, instead of changing $\Delta\epsilon_{DEC}$, it may be thought to bind with complementary law the positions of both thresholds (thus without affecting the TU wander rejection) to $\Delta\theta$, TUn, DEC and AUs (the modes of comparison with the thresholds for the stuffing decision remain unchanged):

$$Sv\_inf = Sinf - f(\Delta\theta, TUn, DEC, AUs) \qquad 40)$$

$$Sv\_sup = Ssup - f(\Delta\theta, TUn, DEC, AUs) \qquad 41)$$

The problem of the choice of the decision point in minimizing the storages can be made marginal by seeing that the position of the thresholds depends on the same variables to which the error $\Delta\epsilon_{DEC}$ is bound: in fact what is changing is only the "shape" of the correcting function $f$. Operatively, what has been said means to "shift", in function of the AU-pointer of the write frame, the error transitions to the decision, circuit in the minimum static band areas.

On the contrary, if the target is to reduce to the maximum extent, as close as possible to the theoretical minimum limit, the wander introduced by the conversion of the AU-stuffings at HPA level on any transported load, the threshold variation law must be oriented to the modification of the dynamic behavior of the storages. It will be necessary to tend toward the equidistribution of transitions of the error at the decision circuit in the range of possible values of the write AU-pointer. For the definition of a simple algorithm of threshold variations the following theses are essential:

I. Invariance of the error phase at the decision circuit with respect to the number of TU (TUn).

As long as the write frame SOHs are not inserted between the decision edges (defined on the read out), the value of the phase error sampled at the decision circuit (with stationary TU-pointer obviously) is independent of the serial number of the incoming tributary, i.e.

$$\Delta\epsilon_{DEC} = \Delta\epsilon_D(\Delta\epsilon, DEC, AUs) \qquad 42)$$

for $$|\Delta\theta_{DIMriga}| \geq rJ1 + (SD-1)*NTUmax \qquad 43)$$

$$|\Delta\theta_{DIMriga}| \geq rJ1 + (SOH) + SD* NTUmax \qquad 44)$$

where DIMriga is the length of an STM (STS) row, rJ1 are the redundancy columns inserted in the virtual container (VC) of HO and SOH the section columns, SD is the frame sector to which the decision circuit belongs (range number 14 for TU12) and finally NTUmax is the maximum number of transportable Low Order VCs. Therefore it is advisable to choose one decision point in the read multiframe for the tributaries, such that the SOH area of the write frame is not interested; this is always possible, once the offset $\Delta\theta$ between the above-mentioned frames has been fixed.

II. Invariance of the phase error at the decision circuit with respect to the offset $\Delta\theta$ between the SOHs.

The variation of the phase error at the decision circuit, for a given tributary unit, expressed in function of the actual value of the AU-pointer, keeps unaltered against the variations of the offset imposed between the frames except for a translation (AU) with respect to one (arbitrary) phase assumed as a reference, e.g. phase 0 corresponding to in-phase frames.

III. Invariance of the phase error at the decision circuit with respect to the offset $\Delta\theta$ a between the SOHs and to the number (TUn) of TUs.

The combination of assertions I and II is summarized in the assertion that the error sampled at the decision point depends neither on the tributary number nor on the reciprocal position between read and write, provided the:

a) the write SOHs are not positioned in overlapping with the read frame area in which the decision point% are located or inequalities 43) and 44) are fully satisfied;

b) the value of the independent variable AUs is corrected with the translation defined at II (reduction to phase 0 of the pointer through the adding of the parameter AUO)

$$AUO = |AUS + \Delta AUO|_{(AUmax+1)} \qquad 45)$$

In short, point I allows the definition of a unique threshold variation function common to all tributaries, while point II releases the shape of such a function from the various possible positionings between the frames; from point III, it may be asserted that the position of the thresholds depends on the sole AU-pointer, once the configuration parameters (decision point and offset between frames) have been fixed $$f = f(AUs)$$

From the above it is immediate to extrapolate are algorithm which symmetrizes the error pattern about the decision circuit and at the same time, yet assures, still in a minimum storage condition, the holding towards the critical sequence of stuffings. The algorithm is naturally composed of two separated parts: one, of static configuration, linked to the phase difference imposed between read and write; the other one, evolutionary, is connected to the AU-stuffings.

In the following, reference is expressly made to TU12 tributary units in STM.

The static configuration phase (software functionality), being performed once and for all at the initialization of the machine, is naturally referred to the controller charged for setting and monitoring the characteristic parameters of the system. It can be broken down into three steps:

I. Depending on the reciprocal position of the in-put and output frames (value of $\Delta\theta$ unknown a priori); within interval 0 to 2429 (STM or STS-3 frames); 0 to 8909 (STS-1 frames);

Selection of two decision points in such a way that, by choosing either, depending on the value $\Delta\theta$ the invariance, with respect to $\Delta\theta$ and TUn, of the phase error pattern, will occur.

II. Determine the correction constant AUO, to be added to the AU-pointer value according to the following procedure considering the first decision point:

a) the distance, expressed in bytes, between the write and read frames being known, define as offset the value of such a distance, to be made a round figure equal to a multiple of three (for instance, but not necessarily, the upper one) should one operate on STM or STS-3 frames;

b) assign a fixed value to the AU-pointer of the read frame (e.g. zero), and determine the time position of the byte indicated by this, denoting it, e.g., as J1L;

c) the offset of step a) being known, defines the value AUo of the AU-pointer that the write frame should have so that the time position of the byte pointed by this coincide (with error rounded off as in step a)) with the J1L individuated in step b)

d) define the correct value of the write AU-pointer as a sum of the parameter AUo defined in step c) and the current write AU-pointer modulo 783;

e) process the value obtained at step d) as effective write AU-pointer for the purpose of determining the table describing the modification law of the position of thresholds, considering therein the offset between write and read frames as null.

III. Repeat the operation of step II for the second decision point thus obtaining two decision points and two threshold modification tables.

The actions contemplated by the evolutional part of the algorithm (hardware functionality) at every multiframe are:

I. Reduction to phase zero of the actual value of the pointer through the adding (SUM MODULO 783) of the constant AUO set by the controller, the above-mentioned offset $\Delta\emptyset$ being known.

II. Eventual translation of the thresholds position in function of the modified value (AUO) of the pointer (THRESHOLDS VARIATION: for a circuit it is a matter of combinatory logic).

III. Sampling of the phase error at the decision circuit and comparison with the thresholds (stuffing decision to COMPARATOR).

IV. TU-stuffing execution (if required) at the first opportunity (subsequent multiframe).

Figure 3:
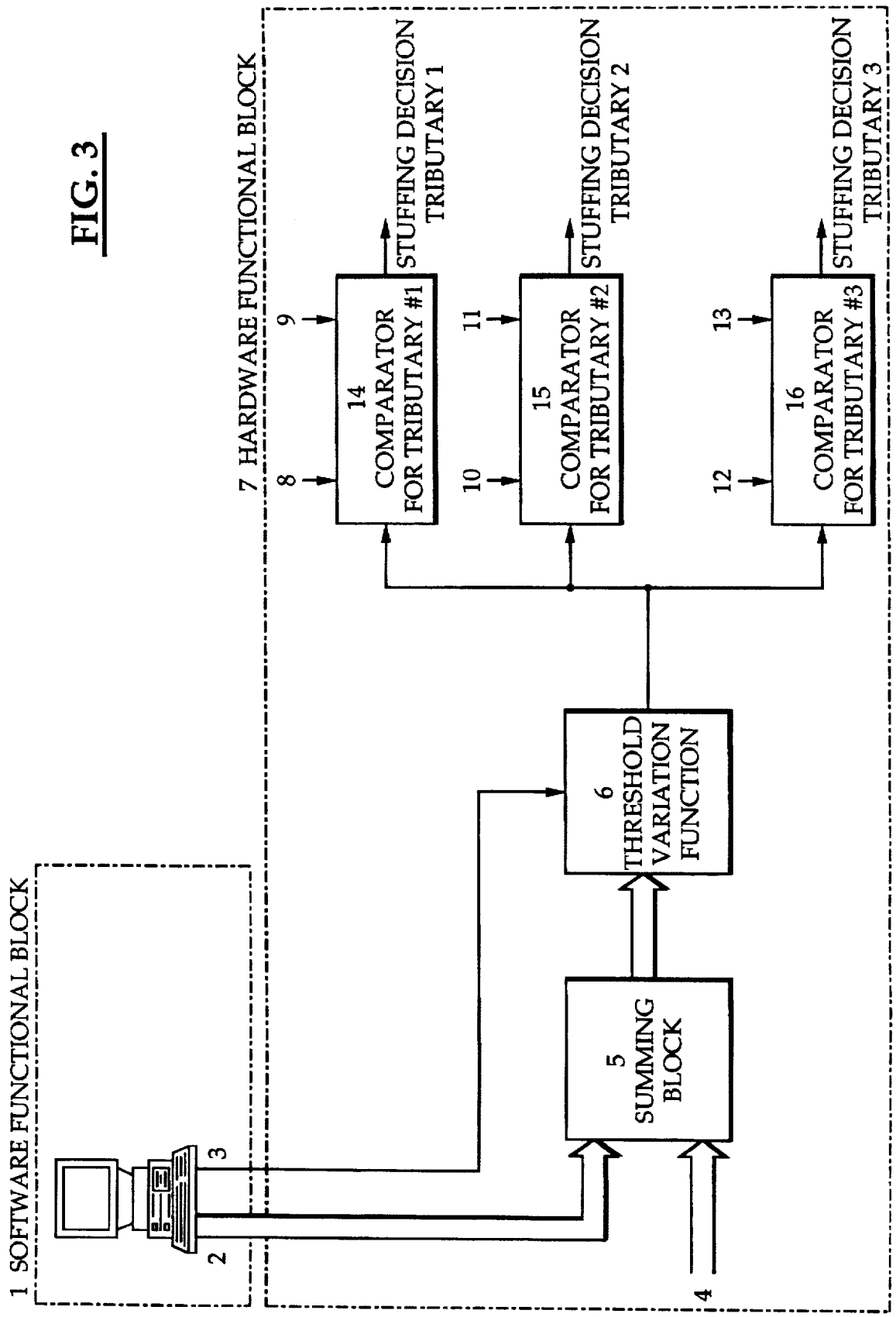
FIG. 3 is a block diagram of a circuit arrangement in accordance with the present invention.

FIG. 3 shows how a software function block 1 determines, the $\Delta\emptyset$ between frames being known, which of the two decision circuits is to be used and a correction value $\Delta$ AUo 2, and then decides (the signal is on terminal 3), each time, if the thresholds are to be shifted and how. A summing block 5 of the hardware functions 7 dynamically carries out the sum of the AU4 pointer value and the correction value $\Delta$ AUo 2. The threshold variation function 6 applies one of the two tables defined above, depending on the programmed decision point. Comparators 14, 15, 16 for every tributary carry out the difference between the read addresses 8, 10, 12 and write ones 9, 11, 13, eventually performing the shifting of the thresholds. The result, for every tributary, is the eventual justification.

An optimization example for minimizing the transit time is now illustrated. In case of tributaries TU12 in STM-1 frame, through the application of the threshold variation algorithm, the chosen decision points reduce to only two, summarized in TABLE 3: in this case, in practice, there is a series of positionings between the frames for which the holding can be greater than the limits indicated that refer to the worst conditions (maximum number of values AUs at maximum static band). The choice of using the DECISION CIRCUIT #1 (V4) or #36 (in subframe 4) is not casual but is due to realization simplicity reasons (simplification of the hardware circuitry): in fact for them it is a function defined on only two values (defined in a matrix form, it is shown in TABLE 2) of the type:

$f=0 \rightarrow$ THRESHOLDS IN NOMINAL POSITION $f=1 \rightarrow$ THRESHOLDS SHIFTED DOWNWARDS BY ONE UNIT On the contrary, for other decision points, even if belonging to the same frame sectors as the preceding ones, it would be defined on three values such as:

$f=0 \rightarrow$ THRESHOLDS IN NOMINAL POSITION $f=1 \rightarrow$ THRESHOLDS SHIFTED DOWNWARDS BY ONE UNIT $f=-1 \rightarrow$ THRESHOLDS SHIFTED UPWARDS BY ONE UNIT In FIG. 4, located on x-axis are the values of the write AU-pointer and on y-axis is the space occupied by the elastic storage (with the exception of the read TU-stuffings). The dots represent the phase error pattern, sampled at the decision instant in the assumption of unchanged thresholds. Instead, the stars represent the phase error pattern sampled at the decision instant in the assumption Of modified (+1) thresholds in the (multi) frames indicated by the "Xs".

Therefore, as exemplified in FIG. 4, the alteration of the position of the thresholds is defined in the multiframe designated by "X". Therewith, the stuffing requests, due to movements of AU-pointers of the write frame, are shifted it a position remote from the dynamic band transitions.

As to the problem of the wander generated by systematic movements of write AUs, it is possible to exploit the threshold position modification function in such a way as to reduce the maximum number of consecutive AU-stuffings absorbed without generating TU-stuffings of eq. 36). In other words, the positions of the AUcs are modified in such a way as to reduce the maximum value of $N_{AU_{giu}}$. There is imposed that at the area of partially overlapped frames, the position of the thresholds is altered in such a way that requests for stuffing are generated, for instance distributed in three intervals of 27 stuffings each, instead of one 45-stuffing interval followed by two 21-stuffing intervals. Being this a reduced static band area, the shifting of the requests for stuffing (limited to the area itself) does not affect the holding to overlapped write TU- and AU-stuffings that remains equal to the one assured in the other areas of the frame. The magnitude of the inserted wander is:

$$J_{AUmax} = J_{single\ just.} + 5 = 12.3\ UI \qquad 46)$$

TABLE 2

| Row index | AU-value range with row shifted thresholds one unit downwards (f = 1) | | | |
|---|---|---|---|---|
| DEFINITION OF THRESHOLD VARIATION FUNCTION FOR OPTIMIZING THE TRANSIT TIME OF TU12 IN STM: DECISION CIRCUIT ≠ (V4) | | | | |
| 1 | 523 ÷ 533 | 547 ÷ 554 | 568 ÷ 575 | 589 ÷ 596 |
| 2 | 610 ÷ 620 | 634 ÷ 641 | 655 ÷ 662 | 676 ÷ 683 |
| 3 | 697 ÷ 707 | 721 ÷ 728 | 742 ÷ 755 | 763 ÷ 782 |
| 4 | — | 25 ÷ 26 | 46 ÷ 53 | 67 ÷ 74 |
| 5 | 88 ÷ 98 | 112 ÷ 119 | 133 ÷ 140 | 154 ÷ 161 |
| 6 | 175 ÷ 185 | 199 ÷ 206 | 220 ÷ 227 | 241 ÷ 248 |
| 7 | 262 ÷ 272 | 286 ÷ 293 | 307 ÷ 314 | 328 ÷ 335 |
| 8 | 349 ÷ 359 | 373 ÷ 380 | 394 ÷ 401 | 415 ÷ 422 |
| 9 | 436 ÷ 446 | 460 ÷ 467 | 481 ÷ 488 | 502 ÷ 509 |
| DEFINITION OF THRESHOLD VARIATION FUNCTION FOR OPTIMIZING THE TRANSIT TIME OF TU12 IN STM: DECISION CIRCUIT ≠ 36 (subframe 4) | | | | |
| 1 | 523 ÷ 336 | 544 ÷ 557 | 565 ÷ 578 | 586 ÷ 599 |
| 2 | 610 ÷ 623 | 631 ÷ 644 | 652 ÷ 665 | 673 ÷ 686 |
| 3 | 697 ÷ 710 | 718 ÷ 731 | 739 ÷ 758 | — |

TABLE 2-continued

| Row index | AU-value range with row shifted thresholds one unit downwards (f = 1) | | | |
|---|---|---|---|---|
| 4 | 1 ÷ 2 | 22 ÷ 29 | 43 ÷ 56 | 64 ÷ 77 |
| 5 | 88 ÷ 101 | 109 ÷ 122 | 130 ÷ 143 | 151 ÷ 164 |
| 6 | 175 ÷ 188 | 196 ÷ 209 | 217 ÷ 230 | 238 ÷ 251 |
| 7 | 262 ÷ 275 | 283 ÷ 296 | 304 ÷ 317 | 325 ÷ 338 |
| 8 | 349 ÷ 362 | 370 ÷ 383 | 391 ÷ 404 | 412 ÷ 425 |
| 9 | 436 ÷ 449 | 457 ÷ 470 | 478 ÷ 491 | 499 ÷ 512 |

TABLE 3

Characteristics of DECISION POINTS in STM for TU12 with THRESHOLDS VARIABLE in conformity with the law assigned in Table 2 - Variable Parameters: $\Delta\phi = 1271$; TUn = 163

| DEC (subframe) (edge) | Statistic avg delay (μs ref. to 2 Mb/s) | UA-stuffing jitter (UI ref. to 2 Mb/s) | Storage capacity (bytes) |
|---|---|---|---|
| 4 - #1 | 11.91 | 12.3 | 4 + 1st |
| 4 - #36 | 11.60 | 12.3 | 4 ÷ 1st |

The indicated values have been computed with a frame format coherent with CCITT Specs.

An optimization example for minimizing the generated wander is now illustrated. In case of TU12 tributaries in STM-1 frame, through the application of the threshold variation algorithm the selected decision points are reduced to only two, summarized in TABLE 4.

In this case $f$ will be defined on three values such as:

$f=0 \rightarrow$ THRESHOLDS IN NOMINAL POSITION $f=1 \rightarrow$ THRESHOLDS SHIFTED DOWNWARDS BY ONE UNIT $f=-1 \rightarrow$ THRESHOLDS SHIFTED UPWARDS BY ONE UNIT As exemplified in FIG. 4, the alteration of the position of the thresholds is defined in the multiframes designated by "X". Therewith, the threshold position modification function is exploited to reduce the maximum number of consecutive AU-stuffings absorbed without generating TU-stuffings of eq. 36). In other words, the positions of the AUcs are modified to reduce the maximum value of $N_{AUgiu}$. It is imposed that requests for stuffings are generated and distributed in the best of the possible ways: instead of 35 stuffings distributed as in FIG. 2, 22 intervals of 22 stuffings and 13 intervals of 23 stuffings are defined, inserted in a regular fashion. The magnitude of the inserted wander is:

$$J_{AUmax} = J_{single\;just.} + 0.32 = 7.63 UI \qquad 47)$$

TABLE 4

| Row Index | AU-value range with thresholds having index shifted downwards by one unit (negative row intervals) or upwards (positive intervals) | | | |
|---|---|---|---|---|
| Definition of threshold variation function for optimization of TU12 wander in STM: decision circuit ≠ 1 (V4) | | | | |
| 1 | −523 + 524 | — | −568 + 568 | −589 + 591 |
| 2 | −610 + 613 | −634 + 635 | −655 + 658 | −676 + 680 |
| 3 | −697 + 703 | −721 + 725 | −742 + 747 | −763 + 770 |
| 4 | +10 ÷ 24 | +32 + 45 | +55 + 66 | +77 + 87 |
| 5 | +100 + 111 | +122 + 132 | +144 + 153 | +167 + 174 |
| 6 | +189 + 198 | +211 + 219 | +234 + 240 | +256 + 261 |
| 7 | +279 + 285 | +301 + 306 | +323 + 327 | +346 + 348 |

TABLE 4-continued

| Row Index | AU-value range with thresholds having index shifted downwards by one unit (negative row intervals) or upwards (positive intervals) | | | |
|---|---|---|---|---|
| 8 | +368 + 372 | +390 + 393 | +313 + 414 | — |
| 9 | +435 + 435 | +457 + 459 | +480 + 480 | — |
| Definition of threshold variation function for optimization of TU12 wander in STM: decision circuit ≠ 36 (subframe 4) | | | | |
| 1 | −523 + 527 | −544 + 549 | −565 + 571 | −586 + 594 |
| 2 | −610 + 616 | −631 + 638 | −652 + 661 | −273 + 683 |
| 3 | −697 + 706 | −718 + 728 | −739 + 750 | +774 + 0 |
| 4 | +13 + 21 | +35 + 42 | +58 + 63 | +80 + 87 |
| 5 | +103 + 108 | +125 + 129 | +147 + 150 | +170 + 174 |
| 6 | +192 + 195 | +214 + 216 | +237 + 237 | +259 + 261 |
| 7 | +282 + 282 | — | −325 + 325 | — |
| 8 | — | −370 + 370 | −391 + 392 | −412 + 415 |
| 9 | −436 + 437 | −457 + 459 | −478 + 482 | −499 + 504 |

We claim:

1. Method of realizing a higher path adaptation (HPA) function in synchronous digital hierarchy (SDH) equipment, wherein the method comprises the step of altering instants of justification of a read frame tributary unit pointer (TU-pointer) as a function of a value of a write frame auxiliary unit pointer (AU-pointer) by applying an alteration law to decision threshold values of the instants of justification.

2. Method according to claim 1, wherein said decision thresholds are altered in such a way that the instants of justification of the read frame tributary unit pointer (TU-pointer) are for compensating in advance eventual requests for an increase in an amount of memory occupied.

3. Method according to claim 2, wherein said thresholds are altered in such a way as to tend to make the instants of justification of the read frame tributary unit pointer (TU-pointer) equi-spaced.

4. Method according to claim 2, wherein the method further comprises the steps of:

a) attributing an arbitrary fixed value to the read frame AU-pointer;

b) providing a phase-error as a difference between a write address and a read address, sampled in correspondence with a storage write in or a read out of a byte;

c) selecting one of a read or write frame with respect to which to sample the phase-error defined in step (b);

d) providing, for every tributary, a decision point in the frame selected in step (c) equal for said every tributary;

e) calculating the phase-error at the decision point defined in step (d);

f) providing a static phase value for the phase-error calculated in step (e), in an absence of justifications, for every value of the write AU-pointer;

g) using write and read instants implicit in respective write and read frames for obtaining a dynamic storage band and for obtaining values of the write frame AU-pointer such that a write AU-stuffing generates a discontinuity in the dynamic storage band;

h) determining in which areas and in which way the phase-error calculated in step (e) should assume a value different from the one defined in step (f) so as to compensate in advance for the discontinuity obtained in step (g), so that an AU-stuffing as described in step (g) does not cause storage of a further byte;

i) determining two thresholds for a stuffing decision, respectively positive and negative, in positions about the static phase defined in step (f);

j) altering, according to the areas and in the way defined in step (h), the positions of the thresholds defined in step (i) so that, in so-altered areas a request for read TU-stuffing that shifts the phase-error calculated in step (e) in a position of step (h) arises, compensating in advance for the discontinuity of step (g);

k) determining a storage capacity as a result of a sum of a hysteresis between the thresholds of step (i), defining a static storage band, and a margin necessary for tolerating a write TU-stuffing positive or negative, thus eliminating effects of the dynamic storage band.

5. Method in accordance with claim 1, wherein said decision thresholds are altered in such a way as to tend to make the instants of justification of the read frame tributary unit pointer (TU-pointer) equi-spaced.

6. Method according to claim 5, comprising the steps of:

a) attributing an arbitrarily fixed value to the read frame AU-pointer;

b) defining a phase error as a difference between a write and a read address sampled in correspondence with a writing or a reading of a byte;

c) choosing one of a read or write frame, with respect to which to sample the phase error of step b);

d) defining for each tributary a decision point in the frame chosen in step c) equal for said each tributary;

e) calculating the phase error at the decision point defined in step d);

f) defining a static phase value that the phase error calculated in step e) must have, in an absence of justifications, for every value of the write AU-pointer;

g) obtaining a phase error pattern from the preceding steps;

h) measuring a distance between observed discontinuities, in terms of values of AU, the values of the write AU-pointer relative to discontinuities of the pattern obtained at g) corresponding to the positions in which a read TU-stuffing would be performed, in a fixed-threshold system, in case of monotone sequences of write AU-stuffings;

i) defining the areas in which the position of the thresholds is alterable in such a way that, by shifting the AU-pointer values for which requests for TU-stuffings are generated, the discontinuities observed at step h) are equispaced as far as possible.

7. Method of realizing a higher path adaptation (HPA) function in synchronous digital hierarchy (SDH) equipment, wherein the method comprises the step of altering instants of justification of a read frame tributary unit pointer (TU-pointer) as a function of a value of a write frame auxiliary unit pointer (AU-pointer), wherein the method includes the step of determining a decision instant of justification that, for all tributaries, never crosses a section overhead (SOH) area in a write frame.

8. Method according to claim 7, comprising the steps of:

a) determining two possible decision points in a read multiframe of a generic TU that belong to two columns of an STM frame, distinct from each other;

b) determining a first set of decision circuits as a set of bytes corresponding to a first decision point selected in the step a), for all tributaries;

c) determining a second set of decision circuits as a set of bytes corresponding to a second decision point selected in the step a) for all tributaries;

d) determining, according to known offset between the read and write frames, which set of decision circuits, among those defined at steps b) and c), does not cross the SOH area of the write frame;

e) selecting, between the two decision points of step a), for all tributaries, a point whose set satisfies the condition of step d).

9. Method of realizing a higher path adaptation (HPA) function in synchronous digital hierarchy (SDH) equipment, wherein the method comprises the step of altering instants of justification of a read frame tributary unit pointer (TU-pointer) as a function of a value of a write frame auxiliary unit pointer (AU-pointer), wherein the method includes the step of determining a correction factor to be summed to a received value of an auxiliary unit pointer (AU-pointer) to take a relative position of a read frame and a write frame into account.

10. Method according to claim 9, comprising the steps of:

a) selecting an arbitrary reference position of the write frame with respect to the read frame;

b) determining a known distance, expressed in bytes, between the write and read frames as an offset therebetween;

c) assigning a fixed value to the AU-pointer of the read frame and determining a time position of a byte indicated by it;

d) determining, according to the known offset defined in the step b), a parameter value AUo of the AU-pointer that the write frame should have in order that the time position of the byte pointed by it approximates the value individuated at step c) as much as possible;

e) determining a correct value of the write AU-pointer as an absolute value of a sum of the parameter value Auo of step d) and a current write AU-pointer, where such absolute value is a maximum value that AU may assume;

f) processing the value obtained in the step e) as an effective write AU-pointer considering the offset between the write and read frame as having a value equal to the one selected at step a).

11. Circuit arrangement for a realization of a higher path adaptation (HPA) function in SDH equipment, wherein the circuit comprises means for altering instants of justification of a read frame tributary unit pointer (TU-pointer) as a function of a value of a write frame auxiliary unit pointer (AU-pointer) by applying an alteration law to decision threshold values of the instants of justification.

12. Circuit arrangement for a realization of a higher path adaptation (HPA) function in SDH equipment, wherein the circuit comprises means for altering instants of justification of a read frame tributary unit pointer (TU-pointer) as a function of a value of a write frame auxiliary unit pointer (AU-pointer), wherein the circuit comprises: means for determining an offset value between a write and read frame and a relative correction value of the write frame auxiliary unit pointer (AU-pointer); means for adding said relative correction value of the write frame auxiliary unit pointer (AU-pointer); means for determining the extent of variation of thresholds; and means for comparing write and read addresses.

* * * * *